United States Patent [19]
Primlani

[11] Patent Number: 5,617,608
[45] Date of Patent: Apr. 8, 1997

[54] WINDSHIELD PROTECTION AND CLEANING SYSTEM

[76] Inventor: Indru J. Primlani, 2616 NE. 19th St., Renton, Wash. 98056

[21] Appl. No.: 299,191

[22] Filed: Aug. 30, 1994

[51] Int. Cl.⁶ .................................................... B60S 1/54
[52] U.S. Cl. .......................................... 15/313; 15/250.001
[58] Field of Search ........................... 15/313, 250 R, 15/250.02, 250.05

[56] References Cited

U.S. PATENT DOCUMENTS

| | | | |
|---|---|---|---|
| 3,423,026 | 1/1969 | Carpenter | 15/313 X |
| 5,097,563 | 3/1992 | Cowan | 15/313 |
| 5,140,719 | 8/1992 | Cowan | 15/313 |
| 5,486,139 | 1/1996 | Papp | 15/313 X |

FOREIGN PATENT DOCUMENTS

| | | | |
|---|---|---|---|
| 2566350 | 12/1985 | France | 15/313 |
| 2338597 | 2/1975 | Germany | 15/313 |
| 206453 | 12/1983 | Japan | 15/313 |
| 71745 | 4/1987 | Japan | 15/313 |
| 269761 | 11/1988 | Japan | 15/313 |
| 24248 | 1/1990 | Japan | 15/313 |
| 2-310147 | 12/1990 | Japan | 15/313 |
| 4201766 | 7/1992 | Japan | 15/313 |
| 5105036 | 4/1993 | Japan | 15/313 |
| 1749082 | 7/1992 | U.S.S.R. | 15/313 |

*Primary Examiner*—Chris K. Moore
*Attorney, Agent, or Firm*—David L. Tingey

[57] ABSTRACT

A ram air duct directed to a vehicle's windshield receives ram air from behind a vehicle's engine coolant radiator which air is rammed through the radiator to heat the air and into the ram air duct by motion of the vehicle causing a heated air curtain over the windshield. During use at slow speeds, a fan may assist air movement from the radiator into the ram air duct. Supplemental heat may be obtained from electric heaters or the engine exhaust manifolds or both. To reduce vehicle drag due to its trailing vacuum and to the turbulence it causes, an air-collecting scoop is provided at the top of the windshield to receive air of the curtain as it leaves the windshield. The collected air is then ducted to the rear of the vehicle and exhausted into the trailing vacuum to reduce vehicle drag.

5 Claims, 1 Drawing Sheet

WINDSHIELD PROTECTION AND CLEANING SYSTEM

FIELD OF THE INVENTION

This invention relates to devices and methods for cleaning windshields, and particularly to devices for maintaining windshields clean during vehicle movement by forming an air barrier in front of the windshield to deflect dirt, bugs, rain and other light, flying objects from the windshield.

BACKGROUND OF THE INVENTION

The State of The Art comprises windshield wipers, running continuously or intermittently, to clear rain water and road spray. A washer system liquid spray is used to clean the windshield of dirt and road grease. These systems are not effective in removing atmospheric borne, auto generated grease. Cleaning solutions must be "weak" so as not to damage auto paint.

Windshield washers are standard equipment on vehicles but are not effective in removing road grease and flying pebbles that put pock marks and cracks in the windshield.

During cold weather, due to unequal expansion, because of hot inside surface and cold outside surfaces, the windshield is stressed at the weak fractures and leads to running cracks. Eventually the windshield has to be replaced.

Bug and rock deflectors are used with some effectiveness on some vehicles. A plastic or metal strip is usually installed at the leading edge of the vehicle. However, these devices create air turbulence and additional aerodynamic drag and do not deflect small rocks, bugs, and rain from the vehicle's windshield.

It is the object of the present invention to capture ram air impinging on the vehicle front while the vehicle is in motion and to route the ram air to the windshield distributed over the windshield to establish an air curtain that deflects small foreign objects away from the windshield.

Providing a object-deflecting windscreen does not fully assure a clean windshield in that ice can accumulate on it. It is therefore a further object that the ram air be heated in a duct that routes the ram air to the windshield, which heated air will melt any ice accumulation or prevent condensation on the windshield.

SUMMARY OF THE INVENTION.

These objects are obtained in a heated air curtain over the windshield obtained by receiving ram air from behind a vehicles engine coolant radiator into a ram air duct, which air is rammed through the radiator and into the ram air duct by motion of the vehicle. During use at slow speeds, a fan may assist air movement from the radiator into the ram air duct.

At the exit end of the ram air duct is a broad nozzle that directs an air curtain over the windshield to divert light flying objects, rain and snow, debris, and other foreign material from the windshield. Air pressure for the air curtain is obtained from ram pressure as the vehicle moves at high speed through air. The air pressure may be boosted by a fan for use at lower speeds.

Ice can also accumulate on a windshield in cold weather independently of such airborne particles that by design are carried over the vehicle by the wind curtain. Thus, warm ram air is required in the wind curtain. To achieve warm air in combination with the ram effect required, ram air is received from behind radiators in the engine compartment, which air has been applied through the radiator to cool the radiator and hence heat the air without substantially losing the ram effect of the air. For use when additional heat may needed to warm the air, supplemental heat may be obtained from electric heaters or the engine exhaust manifolds or both. The heated air is then ducted to the windshield.

As an object moves through a fluid media, reduced media pressure obtains behind the moving object which results in increased drag counter to the movement of the vehicle. Thus, a reduced air pressure behind a moving vehicle in air, termed "trailing vacuum" herein, adds resistance to its movement proportional to the difference between ambient pressure and the trailing vacuum. To reduce vehicle drag due to its trailing vacuum and to the turbulence it causes, an air-collecting scoop is provided at the top of the windshield to receive air of the curtain as it leaves the windshield. The collected air is ducted to the rear of the vehicle and exhausted into the trailing vacuum to reduce vehicle drag.

Similar systems can be used for head lights of vehicles, ships, aircraft and any other self-propelled vehicles.

DETAILED DESCRIPTION OF THE PREFERRED EMBODIMENT

Figure 1:
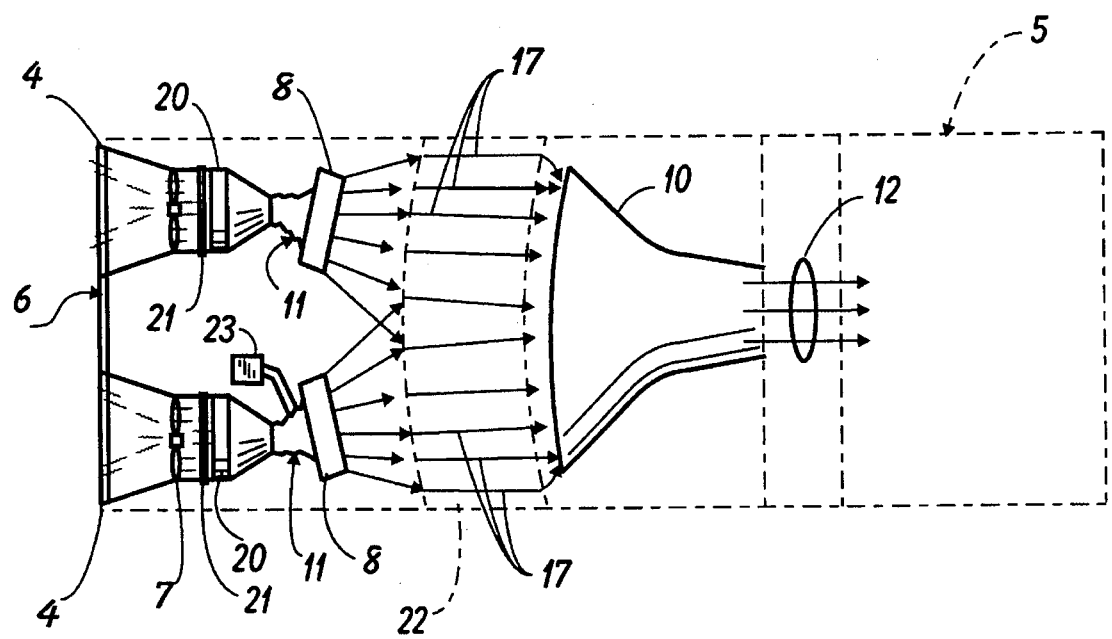
FIG. 1 is a top plan view of a vehicle with the windshield heated air curtain.
Figure 2:
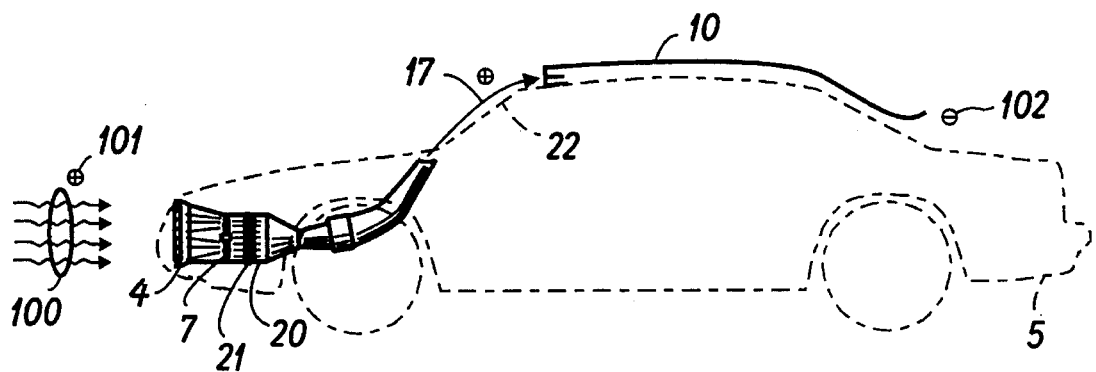
FIG. 2 is a side elevation view of a vehicle with the integrated heated air curtain.

Intake nozzles 4 are arranged on a vehicle 5 at its front 6 to receive ram air 100 upon vehicle motion. The ram air 100 is ducted in one or more ducts 11 to a vehicle windshield 22 where the air is discharged upward and parallel to the vehicle windshield 22 through a discharge air diffuser 8 forming a heated air curtain 17 over the windshield 22. To substantially cover the windshield 22 with the air curtain 17, the discharge diffuser 8 is shaped to distribute air fanned over the windshield.

Within the ram air duct 11 is a radiator heat exchanger 21 to warm the ram air, which radiator is typically the vehicle engine coolant radiator. An auxiliary fan 7 in the duct 11 augments flow through the radiator heat exchanger 21. Ram air is further heated as necessary by an auxiliary heat exchanger flue 20 also in the duct, which flue is heated by vehicle engine heat such as from its exhaust manifolds (not shown). To facilitate use when the vehicle 5 is in slow motion and failing to produce sufficient ram air, an air compressor 23 feeds additional air supplementary to ram air 100 into the duct 11.

An air scoop 10 is mounted on the vehicle 5 at the windshield top 12 to receive air from the air curtain 17 which air is conducted in the scoop 10 for discharge in laminar flow over a rear window rearward of the vehicle 5 to offset a trailing vacuum and turbulence caused by the vehicle 5 in motion through an air medium. An exhaust fan 9 is provided in the air scoop 10 to supplement air draw into the scoop.

What I claim is:

1. A vehicle windshield ram air curtain device in a vehicle with a windshield having a top, the improvement comprising
   an intake nozzle arranged on a vehicle at its front to receive ram air upon vehicle motion,
   a ram air duct from said intake nozzle terminating in a broad discharge air diffuser shaped to distribute air fanned over the windshield for directing ram air upward and parallel to the vehicle windshield forming an air curtain over the windshield.

2. The device of claim 1 further comprising an air compressor in fluid communication with the ram air duct supplying supplemental air into the duct additional to the ram air.

3. The device of claim 1 further comprising an air scoop mounted on the vehicle at the windshield top to receive air from the air curtain, the scoop configured to conduct air from the air curtain for discharge into a reduced pressure region rearward of the vehicle caused by forward vehicle motion.

4. The device of claim 3 further comprising an exhaust fan in the air scoop to supplement air draw into the scoop.

5. A vehicle windshield ram air curtain device in combination with an air scoop receiving ram air from the device, the combination comprising an intake nozzle arranged on a vehicle at its front to receive ram air upon vehicle motion, a ram air duct from said intake nozzle terminating in a broad discharge air diffuser shaped to distribute air fanned over the windshield for directing ram air upward and parallel to the vehicle windshield forming an air curtain over the windshield, an air scoop mounted on the vehicle at the windshield top to receive air from the air curtain, the scoop configured to conduct air from the air curtain for discharge into a reduced pressure region rearward of the vehicle caused by forward vehicle motion.

* * * * *